United States Patent
Koga et al.

(10) Patent No.: US 9,496,551 B2
(45) Date of Patent: *Nov. 15, 2016

(54) LITHIUM MANGANATE PARTICLES FOR NON-AQUEOUS ELECTROLYTE SECONDARY BATTERY, PROCESS FOR PRODUCING THE SAME, AND NON-AQUEOUS ELECTROLYTE SECONDARY BATTERY

(75) Inventors: Kazumichi Koga, Yamaguchi-ken (JP); Masayuki Uegami, Yamaguchi-ken (JP); Akihisa Kajiyama, Yamaguchi-ken (JP); Kazutoshi Ishizaki, Yamaguchi-ken (JP); Hideaki Sadamura, Yamaguchi-ken (JP)

(73) Assignee: TODA KOGYO CORPORATION, Hiroshima (JP)

( * ) Notice: Subject to any disclaimer, the term of this patent is extended or adjusted under 35 U.S.C. 154(b) by 244 days.

This patent is subject to a terminal disclaimer.

(21) Appl. No.: 12/742,126

(22) PCT Filed: Nov. 12, 2008

(86) PCT No.: PCT/JP2008/003290
§ 371 (c)(1),
(2), (4) Date: Jul. 28, 2010

(87) PCT Pub. No.: WO2009/063630
PCT Pub. Date: May 22, 2009

(65) Prior Publication Data
US 2010/0288969 A1    Nov. 18, 2010

(30) Foreign Application Priority Data
Nov. 12, 2007 (JP) ................. 2007-293760

(51) Int. Cl.
| | |
|---|---|
| *H01B 1/08* | (2006.01) |
| *H01M 4/505* | (2010.01) |
| *C01G 45/12* | (2006.01) |
| *C01G 49/00* | (2006.01) |
| *C01G 51/00* | (2006.01) |
| *C01G 53/00* | (2006.01) |
| *H01M 10/052* | (2010.01) |

(52) U.S. Cl.
CPC .......... *H01M 4/505* (2013.01); *C01G 45/1242* (2013.01); *C01G 49/009* (2013.01);
(Continued)

(58) Field of Classification Search
CPC ........................................................ H01B 1/08
USPC ...................................................... 252/518.1
See application file for complete search history.

(56) References Cited

U.S. PATENT DOCUMENTS

| 5,316,877 A | 5/1994 | Thackeray et al. |
| 6,413,673 B1 | 7/2002 | Kasai et al. |

(Continued)

FOREIGN PATENT DOCUMENTS

| JP | 2001-146425 | 5/2001 |
| JP | 2001-210324 | 8/2001 |

(Continued)

OTHER PUBLICATIONS

International Search Report for PCT/JP2008/003290, mailed Dec. 16, 2008.

(Continued)

*Primary Examiner* — Mark Kopec
*Assistant Examiner* — William Young
(74) *Attorney, Agent, or Firm* — Nixon & Vanderhye P.C.

(57) ABSTRACT

The present invention relates to lithium manganate particles having a primary particle diameter of not less than 1 μm and an average particle diameter ($D_{50}$) of not less than 2 μm and not more than 10 μm as measured by a particle size distribution meter, and forming particles having substantially a single phase, which have a composition represented by the following chemical formula:

$$Li_{1+x}Mn_{2-x-y}Y1_yO_{4+Y2}$$

where Y1 is at least one element selected from the group consisting of Ni, Co, Mg, Fe, Al, Cr and Ti; Y2 is at least one element constituting a sintering aid having a melting point of not higher than 800° C., x and y satisfy 0.03≤x≤0.15 and 0.05≤y≤0.20, respectively, and Y2 is present in an amount of 0.1 to 2.5 mol % based on Mn; the Y1 element being dispersed within the respective particles, and an X-ray diffraction intensity ratio of I(400)/I(111) of the particles being not less than 38% and an X-ray diffraction intensity ratio of I(440)/I(111) thereof being not less than 18%.

9 Claims, 3 Drawing Sheets (52) U.S. Cl.
CPC ............ *C01G 51/54* (2013.01); *C01G 53/54* (2013.01); *H01M 10/052* (2013.01); *C01P 2002/52* (2013.01); *C01P 2002/72* (2013.01); *C01P 2002/85* (2013.01); *C01P 2004/03* (2013.01); *C01P 2004/61* (2013.01); *C01P 2004/62* (2013.01); *C01P 2006/12* (2013.01); *C01P 2006/40* (2013.01); *H01B 1/08* (2013.01); *Y02E 60/122* (2013.01); *Y02P 70/54* (2015.11)

(56) References Cited

U.S. PATENT DOCUMENTS

| | | | |
|---|---|---|---|
| 6,890,456 B2 * | 5/2005 | Noda et al. | 252/518.1 |
| 6,924,064 B2 * | 8/2005 | Kondo | C01G 45/1242 423/593.1 |
| 6,998,071 B2 * | 2/2006 | Maeda et al. | 252/521.2 |

| | | | |
|---|---|---|---|
| 2003/0054248 A1 | 3/2003 | Noda et al. | |
| 2004/0135128 A1 | 7/2004 | Noda et al. | |
| 2005/0175899 A1 | 8/2005 | Noda et al. | |

FOREIGN PATENT DOCUMENTS

| | | |
|---|---|---|
| JP | 2001-216968 | 8/2001 |
| JP | 2002-008654 | 1/2002 |
| JP | 2002-8654 | 1/2002 |
| JP | 2002-33099 | 1/2002 |
| JP | 2002-56846 | 2/2002 |
| JP | 2002-170566 | 6/2002 |

OTHER PUBLICATIONS

Supplementary European Search Report in EP 08 84 9460 dated Mar. 25, 2014.

* cited by examiner

LITHIUM MANGANATE PARTICLES FOR NON-AQUEOUS ELECTROLYTE SECONDARY BATTERY, PROCESS FOR PRODUCING THE SAME, AND NON-AQUEOUS ELECTROLYTE SECONDARY BATTERY

This application is the U.S. national phase of International Application No. PCT/JP2008/003290, filed 12 Nov. 2008, which claims priority to Japanese Application No. 2007-293760, filed 12 Nov. 2007, the entire contents of each of which are hereby incorporated by reference.

TECHNICAL FIELD

The present invention relates to lithium manganate capable of exhibiting a high output and an excellent high-temperature stability.

BACKGROUND ART

With the recent rapid development of portable and cordless electronic devices such as audio-visual (AV) devices and personal computers, there is an increasing demand for secondary batteries or batteries having a small size, a light weight and a high energy density as a power source for driving these electronic devices. Under these circumstances, lithium ion secondary batteries having advantages such as a high charge/discharge voltage and a large charge/discharge capacity have been noticed.

Hitherto, as positive electrode active substances useful for high energy-type lithium ion secondary batteries exhibiting a 4 V-grade voltage, there are generally known $LiMn_2O_4$ having a spinel structure and $LiMnO_2$, $LiCoO_2$, $LiCo_{1-x}Ni_xO_2$ and $LiNiO_2$ having a rock-salt type structure, or the like. Among these active substances, $LiCoO_2$ is more excellent because of a high voltage and a high capacity thereof, but has the problems such as a high production cost due to a less amount of a cobalt raw material supplied, and a poor environmental safety upon disposal of cells obtained therefrom. In consequence, there have now been made earnest studies on lithium manganate particles with a spinel type structure (basic composition: $LiMn_2O_2$; this is similarly applied to the subsequent descriptions) which are produced by using, as a raw material, manganese having a large supply amount, a low cost and a good environmental compatibility.

As is known in the art, the lithium manganate particles may be obtained by mixing a manganese compound and a lithium compound at a predetermined ratio and then calcining the resulting mixture at a temperature of 700 to 800° C.

When using the lithium manganate particles as a positive electrode active substance for lithium ion secondary batteries, the resulting cell has a high voltage and a high energy density, but tends to be deteriorated in charge/discharge cycle characteristics. The reason therefor is considered to be that when charge/discharge cycles are repeated, the crystal lattice is expanded and contracted owing to desorption and insertion behavior of lithium ions in the crystal structure to cause change in volume of the crystal, which results in occurrence of breakage of the crystal lattice or dissolution of Mn in an electrolyte solution.

At present, in the lithium ion secondary batteries using lithium manganate particles, it has been strongly required to suppress deterioration in charge/discharge capacity due to repeated charge/discharge cycles, and improve the charge/discharge cycle characteristics, in particular, under high-temperature and low-temperature conditions.

In order to improve the charge/discharge cycle characteristics of the cells, it is required that the positive electrode active substance used therein which comprises the lithium manganate particles has an excellent packing property and an appropriate size, and further is free from elution of Mn therefrom. To meet the requirements, there have been proposed the method of suitably controlling a particle size and a particle size distribution of the lithium manganate particles; the method of obtaining the lithium manganate particles having a high crystallinity by controlling a calcination temperature thereof; the method of adding different kinds of elements to the lithium manganate particles to strengthen a bonding force of the crystals; the method of subjecting the lithium manganate particles to surface treatment or adding additives thereto to suppress elution of Mn therefrom; or the like.

Conventionally, it is known that aluminum as one of the different kinds of elements is incorporated in the lithium manganate particles (Patent Documents 1 to 6). In addition, it is known that a sintering aid having a melting point of not higher than 800° C., in particular, boron oxide, boric acid, lithium borate or ammonium borate, is added to the lithium manganate particles upon calcination of the particles to attain the effects by addition of the sintering aid (Patent Documents 7 to 11).

More specifically, there are respectively described the method of incorporating a Ca compound and/or an Ni compound as well as an Al compound in the lithium manganate particles (Patent Document 1); the method of incorporating Al in the lithium manganate particles in which positions of peaks of respective diffraction planes as observed in X-ray diffraction analysis thereof are defined (Patent Document 2); the method of incorporating a different kind of element such as Al in the lithium manganate particles and conducting the calcination of the lithium manganate particles at multiple separate stages (Patent Document 3); lithium manganate which is obtained by incorporating a different kind of element such as Al into lithium manganate particles, and has a specific surface area of 0.5 to 0.8 $m^2/g$ and a sodium content of not more than 1000 ppm (Patent Document 4); lithium manganate which is obtained by incorporating a different kind of element such as Al into lithium manganate particles, and has a half value width of (400) plane of not more than 0.22° and comprises crystal particles having an average particle diameter of not more than 2 μm (Patent Document 5); lithium manganate which is obtained by incorporating a different kind of element such as Al into lithium manganate particles, and has a crystallite size of not less than 600 Å and a lattice distortion of not more than 0.1% (Patent Document 6); lithium manganate which is obtained by heat-treating a lithium compound, manganese dioxide and a boron compound at a temperature of 600 to 800° C. (Patent Document 7); lithium manganate particles into which an element whose oxide has a melting point of not higher than 800° C. and a fluorine compound are incorporated (Patent Document 8); a lithium secondary battery comprising boron-containing lithium manganate and lithium nickelate in which the lithium nickelate is present in an amount of 5 to 20% by weight based on the lithium manganate (Patent Document 9); and lithium manganate comprising lithium tetraborate which is calcined at a temperature of 700 to 850° C. (Patent Document 10).

Patent Document 1: Japanese Patent Application Laid-Open (KOAKI) No. 2000-294237

Patent Document 2: Japanese Patent Application Laid-Open (KOAKI) No. 2001-146425

Patent Document 3: Japanese Patent Application Laid-Open (KOAKI) No. 2001-328814

Patent Document 4: Japanese Patent Application Laid-Open (KOAKI) No. 2002-33099

Patent Document 5: Japanese Patent Application Laid-Open (KOAKI) No. 2002-316823

Patent Document 6: Japanese Patent Application Laid-Open (KOAKI) No. 2006-252940

Patent Document 7: Japanese Patent Application Laid-Open (KOAKI) No. 8-195200 (1996)

Patent Document 8: Japanese Patent Application Laid-Open (KOAKI) No. 2001-48547

Patent Document 9: Japanese Patent Application Laid-Open (KOAKI) No. 2002-170566

Patent Document 10: Japanese Patent Application Laid-Open (KOAKI) No. 2005-112710

DISCLOSURE OF THE INVENTION

Problem to be Solved by the Invention

At present, it has been strongly required to provide lithium manganate as a positive electrode active substance for a non-aqueous electrolyte secondary battery which is improved in output characteristics and high-temperature characteristics. However, the lithium manganate capable of fully satisfying these requirements has not been obtained until now.

That is, in the above Patent Documents 1 to 10, there are respectively described lithium manganates in which a part of manganese as a metal element is substituted with a different kind of element, or lithium manganates incorporated with a small amount of a boron compound. However, these lithium manganates have failed to provide cells capable of exhibiting satisfactory high-temperature storage characteristics and, therefore, tend to be insufficient for practical use.

In addition, these conventional materials have also failed to exhibit a level enough to satisfy the high-temperature storage characteristics only by the improvement in crystallizability thereof and, therefore, tend to be insufficient for practical use.

Means for Solving the Problem

The above problems and technical tasks can be solved and accomplished by the following aspects of the present invention.

That is, according to the present invention, there are provided lithium manganate particles having a primary particle diameter of not less than 1 μm and forming particles having substantially a single phase, which have a composition represented by the following chemical formula:

$Li_{1+x}Mn_{2-x-y}Y1_yO_4+Y2$ where Y1 is at least one element selected from the group consisting of Ni, Co, Mg, Fe, Al, Cr and Ti; Y2 is at least one element constituting a sintering aid having a melting point of not higher than 800° C., x and y satisfy 0.03≤x≤0.15 and 0.05≤y≤0.20, respectively, and Y2 is present in an amount of 0.1 to 2.5 mol % based on Mn;

the Y1 element being dispersed within the respective particles, and an X-ray diffraction intensity ratio of I(400)/I(111) of the particles being not less than 38% and an X-ray diffraction intensity ratio of I(440)/I(111) thereof being not less than 18% (Invention 1).

Also, according to the present invention, there are provided the lithium manganate particles as described in the above Invention 1, wherein the lithium manganate particles have a lattice constant of 0.818 to 0.821 nm (Invention 2).

Also, according to the present invention, there are provided the lithium manganate particles as described in the above Invention 1 or 2, wherein the lithium manganate particles have a specific surface area of 0.3 to 1.25 $m^2/g$ as measured by BET method (Invention 3).

Also, according to the present invention, there are provided the lithium manganate particles as described in any one of the above Inventions 1 to 3, wherein the lithium manganate particles have an average particle diameter ($D_{50}$) of 1 to 15 μm (Invention 4).

In addition, according to the present invention, there is provided a process for producing the lithium manganate particles as described in any one of the above Inventions 1 to 4, comprising the steps of:

mixing lithium carbonate, manganese oxide coated with a compound of at least one element selected from the group consisting of Ni, Co, Mg, Fe, Al, Cr and Ti, and a sintering aid having a melting point of not higher than 800° C. with each other; and then calcining the resulting mixture at a temperature of 800 to 1050° C. (Invention 5).

Also, according to the present invention, there is provided the process for producing the lithium manganate particles as described in the above Invention 5, wherein the manganese oxide coated with the compound of at least one element selected from the group consisting of Ni, Co, Mg, Fe, Al, Cr and Ti is obtained by adding an aqueous solution comprising a salt of at least one element selected from the group consisting of Ni, Co, Mg, Fe, Al, Cr and Ti to a water suspension comprising manganese oxide to adjust a pH value of the water suspension and thereby form a coat of the compound of at least one element selected from the group consisting of Ni, Co, Mg, Fe, Al, Cr and Ti on a surface of respective particles of the manganese oxide (Invention 6).

Also, according to the present invention, there is provided the process for producing the lithium manganate particles as described in the above Invention 6, wherein the coat of the compound of at least one element selected from the group consisting of Ni, Co, Mg, Fe, Al, Cr and Ti which is formed on the surface of the respective particles of the manganese oxide is amorphous as analyzed by X-ray diffraction (Invention 7).

Also, according to the present invention, there is provided the process for producing the lithium manganate particles as described in any one of the above Inventions 5 to 7, wherein the manganese oxide is substantially in the form of a single crystal (Invention 8).

Also, according to the present invention, there is provided the process for producing the lithium manganate particles as described in any one of the above Inventions 5 to 8, wherein the manganese oxide has an average particle diameter of not less than 1 μm (Invention 9).

Further, according to the present invention, there is provided a non-aqueous electrolyte secondary battery comprising a positive electrode active substance a part or a whole of which is formed from the lithium manganate particles as described in any one of the above Inventions 1 to 4 (Invention 10).

Further, according to the present invention, there are provided the lithium manganate particles as described in any one of the above Inventions 1 to 4, wherein when a non-aqueous electrolyte secondary battery of a CR 2032 type comprising the lithium manganate particles as a positive electrode active substance, a non-aqueous electrolyte solution (a mixed solution comprising EC and DEC at a mixing ratio of 3:7) to which LiPF$_6$ is added in an amount of 1 mol/L, and a 150 μm-thick Li foil as a negative electrode, is subjected to measurement of charge and discharge capacities, an initial discharge capacity of the cell is not less than 80 mAh/g and not more than 120 mAh/g (Invention 11).

Further, according to the present invention, there are provided the lithium manganate particles as described in any one of the above Inventions 1 to 4, wherein when a non-aqueous electrolyte secondary battery of a CR 2032 type comprising the lithium manganate particles as a positive electrode active substance, a non-aqueous electrolyte solution (a mixed solution comprising EC and DEC at a mixing ratio of 3:7) to which LiPF$_6$ is added in an amount of 1 mol/L, and a 150 μm-thick Li foil as a negative electrode, is subjected to a charge/discharge cycle test for 30 cycles at a 1C rate in a constant temperature oven at 60° C., a ratio of a discharge capacity of the cell as measured at the 30th cycle to a discharge capacity of the cell as measured at the first cycle is not less than 93% (Invention 12).

Further, according to the present invention, there are provided the lithium manganate particles as described in any one of the above Inventions 1 to 4, wherein when a non-aqueous electrolyte secondary battery of a CR 2032 type comprising the lithium manganate particles as a positive electrode active substance, a non-aqueous electrolyte solution (a mixed solution comprising EC and DEC at a mixing ratio of 3:7) to which LiPF$_6$ is added in an amount of 1 mol/L, and a 150 μm-thick Li foil as a negative electrode, is subjected to charge/discharge cycles at a 0.1 C hour rate at a voltage of 3.0 to 4.5 V to measure an initial discharge capacity (a) thereof, charged at a 0.1 C hour rate until reaching 4.5 V and discharged until reaching a discharge depth of 70%, allowed to stand at 60° C. for one week, and then further subjected to charge/discharge cycles at a 0.1 C hour rate to measure a discharge capacity (d) thereof, a capacity recovery rate of the cell which is represented by the formula: 100×d/a, is not less than 95% (Invention 13).

Effect of the Invention

The lithium manganate particles according to the present invention exhibit a high output and are excellent especially in high-temperature stability, and, therefore, can be suitably used as a positive electrode substance for a non-aqueous electrolyte secondary battery.

In addition, when adding a sintering aid having a melting point of not higher than 800° C. to manganese oxide, in particular, adding a small amount of boric acid (H$_3$BO$_3$) to Mn$_3$O$_4$, mixing the mixture with lithium carbonate, and then calcining the resulting composition at a predetermined temperature, it is possible to obtain lithium manganate particles having excellent properties.

PREFERRED EMBODIMENT FOR CARRYING OUT THE INVENTION

The present invention is described in detail below.

First, the lithium manganate particles for a non-aqueous electrolyte secondary battery according to the present invention are described.

The lithium manganate particles according to the present invention comprise at least one element (Y1) selected from the group consisting of Ni, Co, Mg, Fe, Al, Cr and Ti, and has such a crystal structure in which the (400) and (440) planes are grown relative to the (111) plane.

The lithium manganate particles according to the present invention have a composition represented by the following chemical formula:

$$Li_{1+x}Mn_{2-x-y}Y1O_4+Y2$$

in which Y1 is at least one element selected from the group consisting of Ni, Co, Mg, Fe, Al, Cr and Ti. Y2 is at least one constitutional element which is contained in an sintering aid having a melting point of not higher than 800° C.

In the above chemical formula, x is 0.03 to 0.15, and y is 0.05 to 0.20.

When x is less than 0.03, the resulting particles have a high capacity, but tends to be considerably deteriorated in high-temperature characteristics. When x is more than 0.15, the resulting particles are improved in high-temperature characteristics, but tend to be considerably deteriorated in capacity or tend to cause increase in resistance owing to formation of Li-rich phase therein. The value of x is preferably 0.05 to 0.15.

When y is less than 0.05, it may be difficult to attain a sufficient effect of addition of the Y1 element. When y is more than 0.20, the resulting particles tend to suffer from large decrease in capacity and, therefore, tend to be unpractical. The value of y is preferably 0.05 to 0.15.

The content of Y2 based on Mn in the lithium manganate particles is 0.1 to 2.5 mol %. When the content of Y2 based on Mn is less than 0.1 mol %, the sintering aid added may fail to exhibit a sufficient effect. When the content of Y2 based on Mn is more than 2.5 mol %, the degree of aggregation and fusion of the lithium manganate particles tends to be too strong, and very fine powder tends to be undesirably produced when crushed. The content of Y2 based on Mn is preferably 0.5 to 2.0 mol %.

In the lithium manganate particles according to the present invention, the Y1 element (at least one element selected from the group consisting of Ni, Co, Mg, Fe, Al, Cr and Ti) is present within the respective particles. The Y1 element is preferably uniformly present over a whole portion extending from the surface to the central portion of the respective lithium manganate particles without being localized at specific portions thereof. More specifically, when a section of the respective particles is subjected to EPMA plane analysis, the condition in which the Y1 element is uniformly present within the respective particles means such a case where the area of a white portion appearing on the micrograph which portion indicates the presence of the Y1 element is not less than 95%, preferably not less than 98% and more preferably 100% of a cross-sectional area of the respective particles. When the Y1 element is localized in the respective particles, a secondary battery obtained by using the particles tends to be deteriorated in stability.

The Y2 element is preferably present in the vicinity of the surface of the respective particles in the form of a compound with Li so as to form a uniform coating film thereon. If the Y2 element is present even inside of the respective lithium manganate particles, the secondary battery obtained by using the particles tends to be deteriorated in stability.

When subjecting the lithium manganate particles according to the present invention to X-ray diffraction analysis, a peak intensity ratio of I(400)/I(111) thereof is not less than 38%, and a peak intensity ratio of I(440)/I(111) thereof is not less than 18%.

When the respective peak intensity ratios of I(400)/I(111) and I(440)/I(111) are out of the above-specified ranges, the obtained particles tend to cause deterioration in stability and output of the resulting secondary battery. The peak intensity ratio of I(400)/I(111) is preferably 40 to 70%, and the peak intensity ratio of I(440)/I(111) is preferably 20 to 50%.

The lithium manganate particles according to the present invention preferably have a lattice constant of 0.818 to 0.821 nm. When the lattice constant is less than 0.818 nm, the obtained particles tend to cause deterioration in capacity of the resulting cell. When the lattice constant is more than 0.821 nm, the obtained particles tend to cause deterioration in stability of the resulting cell. The lattice constant of the lithium manganate particles is more preferably 0.819 to 0.821 nm.

The BET specific surface area of the lithium manganate particles according to the present invention is preferably 0.3 to 1.25 $m^2/g$. When the BET specific surface area of the lithium manganate particles is less than 0.3 $m^2/g$, the secondary battery obtained by using the particles tends to be deteriorated in output. When the BET specific surface area of the lithium manganate particles is more than 1.25 $m^2/g$, the secondary battery obtained by using the particles tends to be deteriorated in stability. The BET specific surface area of the lithium manganate particles is more preferably 0.35 to 1.2 $m^2/g$.

The lithium manganate particles according to the present invention preferably have an average particle diameter ($D_{50}$; secondary particle diameter) of 1 to 15 µm as measured using a particle size distribution meter. When the average particle diameter ($D_{50}$) of the lithium manganate particles is less than 1 µm, the secondary battery obtained by using the particles tends to be deteriorated in stability. When the average particle diameter ($D_{50}$) of the lithium manganate particles is more than 15 µm, the secondary battery obtained by using the particles tends to be deteriorated in output. The average particle diameter ($D_{50}$) of the lithium manganate particles is more preferably 2 to 10 µm and still more preferably 2 to 9 µm.

The lithium manganate particles according to the present invention preferably have an average primary particle diameter of 1 to 10 µm. When the average primary particle diameter is less than 1 µm, the secondary battery obtained by using the particles tends to be deteriorated in stability. When the average primary particle diameter is more than 10 µm, the secondary battery obtained by using the particles tends to be deteriorated in output. The average primary particle diameter of the lithium manganate particles is more preferably 1 to 9 µm.

The lithium manganate particles according to the present invention are preferably constituted of substantially a single phase. When the lithium manganate particles are constituted of a polycrystal, a large number of lattice-unconformity planes acting as a resistance component upon desorption and insertion of lithium tend to be present in the crystals, so that it may be sometimes difficult to allow the resulting cell to generate a sufficient output.

Next, the process for producing the lithium manganate particles according to the present invention is described.

The lithium manganate particles according to the present invention can be obtained by using trimanganese tetraoxide ($Mn_3O_4$) constituted of substantially a single phase as a manganese precursor, and by conducting the steps of treating the manganese precursor in an aqueous solution thereof to coat the surface of the manganese oxide with a compound of at least one element selected from the group consisting of Ni, Co, Mg, Fe, Al, Cr and Ti in the form of very fine particles having a low crystallinity (it means such a condition that the addition of even 10 mol % of the compound is not detectable by X-ray diffraction), mixing the thus surface-treated manganese oxide, lithium carbonate and a sintering aid having a melting point of not higher than 800° C. with each other, and then calcining the resulting mixture at a temperature of not lower than 800° C. and preferably 850 to 1050° C.

The manganese oxide used in the present invention is preferably trimanganese tetraoxide ($Mn_3O_4$). The trimanganese tetraoxide ($Mn_3O_4$) used in the present invention preferably has an average particle diameter ($D_{50}$) of 1 to 8 µm, a primary particle diameter of 1 to 10 µm and a BET specific surface area of 0.5 to 15 $m^2/g$.

When using the manganese precursor having a high crystallinity, the reactivity of the manganese precursor with the surface-coating compound such as an Al compound tends to be lowered. As a result, even when using the Al compound having a submicron size, etc., it may be difficult to attain a uniform solid solution condition. For this reason, it is required to conduct the reaction under such a condition that the aluminum compound that is very fine and low-crystalline to such an extent as to be undetectable by X-ray diffraction, is uniformly mixed in the manganese precursor.

In order to form the surface-coating material (such as an aluminum compound) which has the above condition, a suspension of manganese oxide may be mixed with an ionic aqueous solution of aluminum to form a uniformly mixed condition of the manganese precursor and aluminum ions, and then a pH value of the resulting mixture may be suitably adjusted, thereby producing such a mixed condition in which the very fine and low-crystalline hydroxide is uniformly mixed in the manganese precursor.

As to the reaction conditions, when being coated with the aluminum compound, the pH value of the reaction solution is controlled to 6 to 10, and the reaction temperature is controlled to 10 to 90° C.

Also, for example, when being coated with Mg, the pH value of the reaction solution is controlled to 9 to 11, and the reaction temperature is controlled to 10 to 90° C. When being coated with Co, the pH value of the reaction solution is preferably controlled to 7 to 10, and the reaction temperature is preferably controlled to 10 to 90° C. When being coated with Ni, the pH value of the reaction solution is preferably controlled to 9 to 11, and the reaction temperature is preferably controlled to 10 to 90° C. When being coated with Fe, the pH value of the reaction solution is preferably controlled to 9 to 11, and the reaction temperature is preferably controlled to 10 to 90° C. When being coated with Cr, the pH value of the reaction solution is preferably controlled to 6 to 10, and the reaction temperature is preferably controlled to 10 to 90° C. When being coated with Ti, the pH value of the reaction solution is preferably controlled to 6 to 10, and the reaction temperature is preferably controlled to 10 to 90° C.

In the present invention, the lithium manganese particles are calcined after adding a sintering aid having a melting point of not higher than 800° C. thereto. The melting point of the sintering aid is preferably not higher than 600° C. The sintering aid having a melting point of not higher than 800° C. is preferably a boron compound (when using the boron compound, Y2 is B(boron)). Examples of the boron compound include boric acid, lithium tetraborate, boron oxide and ammonium borate. Among these boron compounds, the use of boric acid is especially preferred.

Upon the calcination, the boron compound serves as a sintering aid for promoting a crystal growth of lithium manganate. Further, the boron compound has the effect of dulling an edge of the respective lithium manganate particles to form rounded particles. In the conventional lithium manganate, it is considered that manganese is eluted out from an edge portion of the respective particles, resulting in deterioration in characteristics of the obtained cell, in particular, high-temperature characteristics. On the other hand, in the present invention, it is considered that since the edge (angular portion) of the respective lithium manganate particles is dulled to form rounded particles, it is possible to reduce a portion thereof from which manganese is eluted out, so that the resulting secondary battery can be enhanced in stability.

In addition, it is also considered that the boron compound is reacted with lithium contained in the lithium carbonate upon the calcination to form a B—Li-based compound. It is considered that the thus formed B—Li-based compound is melted at a temperature of not lower than 800° C., so that the respective lithium manganate particles are therefore coated with the boron compound thus melted. Thus, it is considered that the boron compound has a function as a kind of protective film, so that the obtained coated particles can be prevented from undergoing elution of manganese therefrom, resulting in enhanced cell characteristics, in particular, under high-temperature conditions.

In the present invention, it is required to subject the particles to calcination at a temperature of not lower than 800° C. When the calcination temperature is lower than 800° C., it is not possible to attain the condition in which aluminum is uniformly dispersed within the respective particles. Also, when the calcination temperature is lower than 800° C., it is not possible to obtain a sufficient effect of aggregating the particles owing to addition of boron.

In the above-mentioned Patent Document 2 (Japanese Patent Application Laid-Open (KOKAI) No. 2001-146425), it is described that the uniformly mixed condition of Al has been confirmed by EPMA analysis of an appearance of the respective particles. Such a result will be attained even when Al is localized only on the surface of the particles. However, when actually measuring an output of a cell obtained using the particles in which Al was localized, such a cell exhibited a large resistance, and it was difficult to generate a suitable current from the cell. The calcination temperature is preferably 850 to 1050° C.

Next, a positive electrode using the positive electrode active substance comprising the lithium manganate particles for a non-aqueous electrolyte secondary battery according to the present invention is described.

When producing the positive electrode using the positive electrode active substance according to the present invention, a conducting agent and a binder are added to and mixed with the positive electrode active substance by an ordinary method. Examples of the preferred conducting agent include acetylene black, carbon black and graphite. Examples of the preferred binder include polytetrafluoroethylene and polyvinylidene fluoride.

The secondary battery produced by using the positive electrode active substance according to the present invention comprises the above positive electrode, a negative electrode and an electrolyte.

Examples of a negative electrode active substance which may be used in the negative electrode include metallic lithium, lithium/aluminum alloys, lithium/tin alloys, graphite and black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving, in addition to lithium phosphate hexafluoride, at least one lithium salt selected from the group consisting of lithium perchlorate and lithium borate tetrafluoride in the above solvent.

The secondary battery produced by using the positive electrode active substance according to the present invention has an initial discharge capacity of not less than 80 mAh/g, and exhibits a capacity retention rate of not less than 55% after being stored at a high temperature, a capacity recovery rate of not less than 95% and a high-temperature cycle capacity retention rate of not less than 93% which are drastically enhanced by using the sintering aid as compared to the case where no sintering aid is used upon calcination of the lithium manganate.

In the positive electrode using the lithium manganate particles according to the present invention, when the discharge capacity thereof is less than 80 mAh/g, the resulting cell tends to exhibit a low output and, therefore, tends to be unpractical. The discharge capacity of the positive electrode is preferably 87 to 113 mAh/g. When the discharge capacity is more than 110 mAh/g, it may be difficult to ensure a sufficient stability of the resulting cell.

<Function>

The important point of the present invention resides in that the lithium manganate particles have a high crystallinity, in particular, a high intensity ratio of each of $I(440)/I(111)$ and $I(400)/I(111)$, in that Ni, Co, Mg, Fe, Al, Cr or Ti as a substituting element is uniformly dispersed in the particles, and in that the constitutional element of the added sintering aid added having a melting point of not higher than 800° C. is present on the surface of the respective particles.

In the present invention, by homogeneously mixing manganese oxide and a coating material such as a fine and low-crystalline aluminum compound with each other to coat the surface of respective particles of manganese oxide with the coating material, adding boric acid to the thus surface-coated particles, and then calcining the resulting mixture at a temperature as high as not lower than 800° C., it is possible to obtain the lithium manganate having the above characteristics.

As a result, the secondary battery using the lithium manganate particles according to the present invention can be improved in both output characteristics and high-temperature storage characteristics at the same time.

EXAMPLES

Typical examples of the present invention are described in more detail below.

The average particle diameter of the particles is a volume-based average particle diameter as measured by a wet laser method using a laser type particle size distribution measuring apparatus "MICROTRACK HRA" manufactured by Nikkiso Co., Ltd.

The primary particle diameter of the particles was expressed by an average value of diameters read out from a SEM image thereof.

The condition of presence of the particles which were coated or allowed to be present on particles was observed using a scanning electron microscope "SEM-EDX" equipped with an energy disperse type X-ray analyzer (manufactured by Hitachi High-Technologies Corp.).

The average primary particle diameter of the particles which were coated or allowed to be present on particles was observed and determined using a scanning electron microscope "SEM-EDX" equipped with an energy disperse type X-ray analyzer (manufactured by Hitachi High-Technologies Corp.).

The X-ray diffraction of the sample was measured using "RAD-IIA" manufactured by Rigaku Co., Ltd.

The lattice constant was calculated from the results of the above powder X-ray diffraction by a Rietveld method.

Whether the particles were constituted of a single phase or not was confirmed from the results obtained from the above powder X-ray diffraction analysis.

Whether the crystal structure was a single crystal or not was confirmed by observing an oriented plane of a section of the particles by EBSD or confirmed from an SEM image thereof.

The coin cell (battery) produced by the following method using the lithium manganate particles was evaluated for initial charge/discharge characteristics and high-temperature storage characteristics.

First, 92% by weight of the Li—Mn composite oxide as a positive electrode active substance, 2.5% by weight of acetylene black and 2.5% by weight of a graphite both serving as a conducting material, and 3% by weight of polyvinylidene fluoride dissolved in N-methyl pyrrolidone as a binder, were mixed with each other, and then the resulting mixture was applied onto an Al metal foil and then dried at 120° C. The thus obtained sheets were each blanked into 16 mmϕ and then compression-bonded together under a pressure of 1.5 t/cm$^2$, thereby producing an electrode having a thickness of 50 μm and using the thus produced electrode as a positive electrode. A metallic lithium blanked into 16 mmϕ was used as a negative electrode, and a solution prepared by mixing EC and DEC with each other at a volume ratio of 3:7 in which 1 mol/L of LiPF$_6$ was dissolved, was used as an electrolyte solution, thereby producing a coin cell of a CR2032 type.

The initial charge/discharge characteristics of the cell were determined as follows. That is, under a room temperature condition, the cell was charged at a current density of 0.1 C until reaching 4.5 V, and then discharged at a current density of 0.1 C until reaching 3.0 V to measure an initial charge capacity, an initial discharge capacity (a) and an initial efficiency of the cell.

Also, the capacity retention rate and capacity recovery rate as high-temperature storage characteristics were determined as follows. That is, the cell was charged at a current density of 0.1 C until reaching 4.5 V and then discharged until reaching a discharge depth of 70%. Thereafter, the cell was allowed to stand at 60° C. for one week to measure a residual discharge capacity (c) and calculate a capacity retention rate (=100×c/(0.3×a)). Further, the cell was subjected once again to charge/discharge cycles at a current density of 0.1 C to measure a discharge capacity (d) and calculate a capacity recovery rate (=100×d/a).

The high-temperature cycle capacity retention rate was determined as follows. That is, the cell was subjected to repeated charge/discharge cycles at a rate of 1C at 60° C., and the ratio of 30th cycle discharge capacity to the initial discharge capacity thereof was measured and determined as the high-temperature cycle capacity retention rate of the cell.

Example 1

Production of Lithium Manganate Particles

Under a nitrogen gas flow, 0.5 mol of manganese sulfate was added to 3.5 mol of sodium hydroxide to prepare a reaction solution having a total volume of 1 L. Manganese hydroxide thus produced was aged at 90° C. for 1 hr. After completion of the aging, air was passed through the reaction solution to oxidize manganese hydroxide at 90° C., and the resulting product was washed with water and then dried, thereby obtaining manganese oxide particles.

The thus obtained manganese oxide particles was $Mn_3O_4$ and had a granular shape, an average particle diameter of 4.8 μm and a BET specific surface area of 0.6 m$^2$/g. When observing an SEM image of the thus obtained manganese oxide particles, it was confirmed that the primary particles thereof were in the form of a single crystal having an octahedral shape surrounded by (111) planes.

The resulting water suspension comprising the manganese oxide particles was washed with water in an amount of 5 times the amount of the water suspension using a filter press, and further subjected to deaggregation to adjust a concentration of the manganese oxide particles in the water suspension to 10% by weight. A 0.2 mol/L sodium aluminate aqueous solution was continuously fed to the suspension in a reaction vessel such that a molar ratio of Mn:Al in the resulting mixture was 95:5. The contents of the reaction vessel were always kept stirred by a stirrer and, at the same time, a 0.2 mol/L sulfuric acid aqueous solution was automatically supplied thereto so as to control the pH value of the reaction solution in the reaction vessel to 8±0.5, thereby obtaining a suspension comprising the manganese oxide particles whose surface was coated with aluminum hydroxide.

The resulting suspension was washed with water in an amount of 10 times the weight of the manganese oxide particles in the suspension using a filter press, and then dried, thereby obtaining the manganese oxide particles whose surface was coated with aluminum hydroxide and which had a molar ratio of Mn:Al of 95:5 and an average secondary particle diameter of 4.8 μm.

Figure 1:
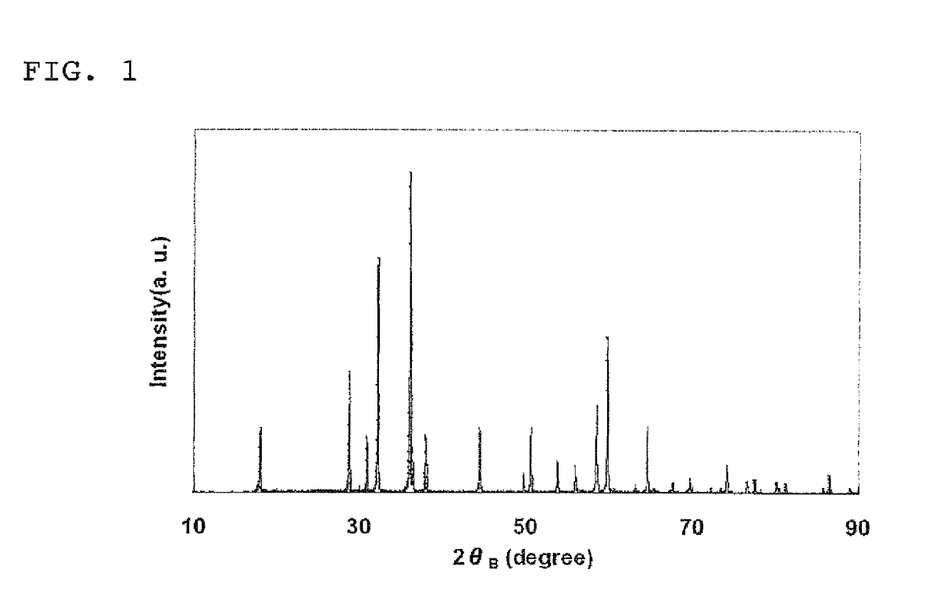
FIG. 1 is an X-ray diffraction pattern of manganese oxide obtained in Example 1 before being treated with Al.
Figure 2:
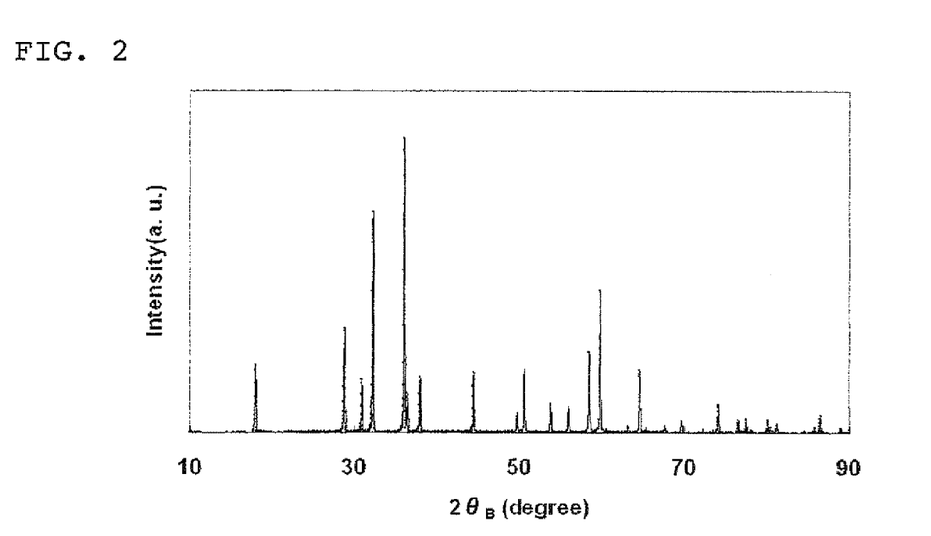
FIG. 2 is an X-ray diffraction pattern of manganese oxide obtained in Example 1 after being treated with Al.

The X-ray diffraction pattern of the manganese oxide before being treated with aluminum is shown in FIG. 1, and the X-ray diffraction pattern of the manganese oxide after being treated with aluminum is shown in FIG. 2. In FIG. 2, no peak attributed to the Al compound was observed. As a result, it was confirmed that the Al compound was present in the form of very fine low-crystalline particles.

Figure 3:
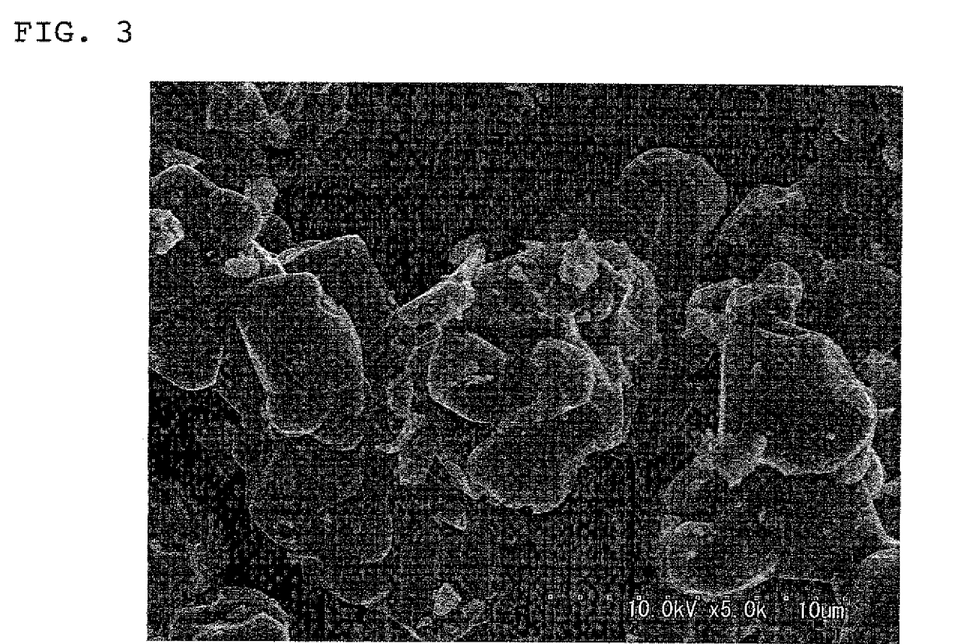
FIG. 3 is a SEM image of lithium manganate particles obtained in Example 1.

The resulting $Mn_3O_4$ particles coated with aluminum hydroxide, lithium carbonate and boric acid which was weighed such that the content of boron in the boric acid was 2.0 mol % based on Mn, were dry-mixed with each other for 1 hr at a proportion of Li:Mn:Al=1.072:1.828:0.10, thereby obtaining a uniform mixture. Thirty grams of the thus obtained mixture was placed in an aluminum crucible, and held therein in atmospheric air at 960° C. for 3 hr, thereby obtaining lithium manganate particles. Thus, the lithium manganate particles were produced. As a result of subjecting the resulting lithium manganate particles to X-ray diffraction analysis, it was confirmed that any peak owing to the boron or boron compound added was not detected, and only lithium manganate having a single phase was present therein. An SEM image of the thus obtained lithium manganate particles is shown in FIG. 3. As shown in FIG. 3, it was confirmed that the obtained particles had no angular portion and were in the form of rounded particles.

It was confirmed that the thus obtained lithium manganate particles had a composition: $Li_{1+x}Mn_{2-x-y}O_4$ in which x is 0.072 and y is 0.10; the amount of the Y2 element (boron) being present in the particles was 1.00 mol % based on Mn; the average primary particle diameter thereof was 5.0 μm; the average particle diameter ($D_{50}$) of secondary particles (behavior particles) thereof was 9.5 μm; the BET specific surface area value thereof was 0.38 m²/g; the intensity ratio of I(400)/I(111) thereof was 51%; the intensity ratio of I(440)/I(111) thereof was 27%; and the lattice constant thereof was 0.8204 nm.

A 200 mL beaker was charged with 5 g of the thus obtained lithium manganate particles and 100 mL of pure water. The contents of the beaker were boiled for 7 min and then cooled, and further filtered through a filter paper No. 5B. The thus obtained filtrate solution was subjected to a solubility test to identify soluble constitutional elements of the particles by ICP. As a result, a whole amount of boron (Y2 element) was dissolved in the solution. Therefore, it was confirmed that boron as the Y2 element was present only on the surface of the respective lithium manganate particles. Further, since the amount of Li dissolved was proportional to the amount of boron dissolved, it was estimated that boron and Li were formed into a compound thereof.

The coin cell produced by using a positive electrode active substance comprising the thus obtained lithium manganate particles had an initial discharge capacity of 110 mAh/g. After the cell was preserved at 60° C. for one week, it was confirmed that the capacity retention rate (RTN) and capacity recovery rate (RCV) of the cell were 59% and 99%, respectively. In addition, after the cell was subjected to 30 charge/discharge cycles at 60° C., it was confirmed that the capacity retention rate of the cell was 98%.

Figure 4:
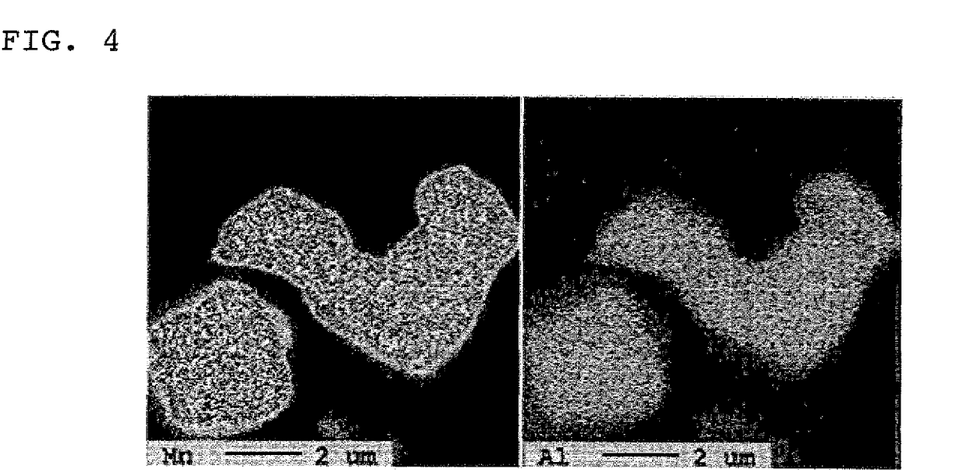
FIG. 4 shows an EPMA mapping of Mn and Al on a section of the particles obtained by kneading the lithium manganate particles obtained in Example 1 in a resin and then cutting the particles kneaded in the resin using a cross-section polisher.

The lithium manganate particles obtained in Example 1 were kneaded with a resin, and the particles in the resulting kneaded material were cut using a cross-section polisher. The results of EPMA mapping of Mn and Al on a section of each of the thus cut particles are shown in FIG. 4. From FIG. 4, it was confirmed that Al was also uniformly distributed over the section of each particle similarly to Mn.

Examples 2 to 6

The same procedure as defined in Example 1 was conducted except that kind of manganese oxide used, kind of Y1, presence or non-presence of Y2, coating amount of aluminum, and calcination conditions, were changed variously, thereby obtaining lithium manganate particles. The production conditions used above are shown in Table 1, and various properties of the thus obtained lithium manganate particles are shown in Table 2.

Comparative Example 1

Manganese oxide ($MnO_2$; average particle diameter: 15 μm), aluminum hydroxide ($Al(OH)_3$) and lithium carbonate were mixed with each other, and then the resulting mixture was calcined at 960° C., thereby obtaining lithium manganate particles.

Comparative Examples 2 to 4

The same procedure as defined in Example 1 was conducted except that kind of manganese oxide used, coating amount of aluminum, amount of boron added and calcination conditions were changed variously, thereby obtaining lithium manganate particles. The production conditions used above are shown in Table 1, and various properties of the thus obtained lithium manganate particles are shown in Table 2.

Figure 5:
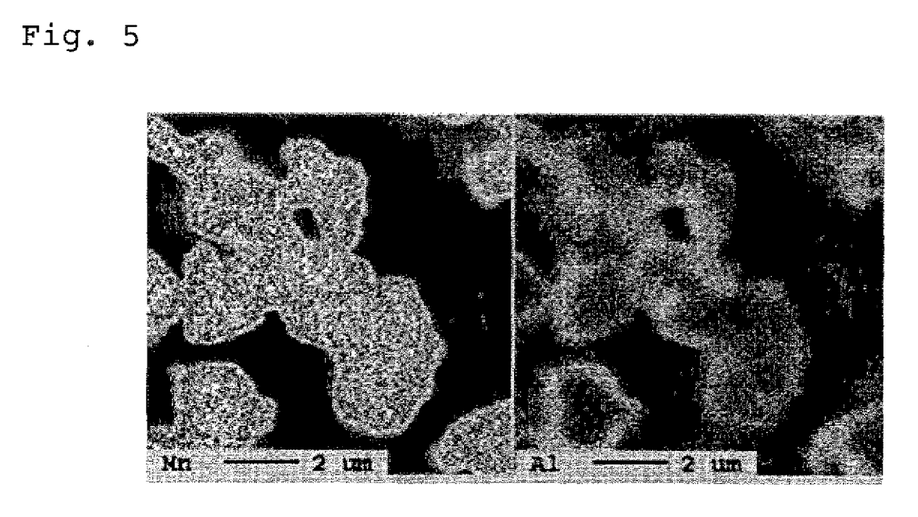
FIG. 5 shows an EPMA mapping of Mn and Al on a section of the particles obtained by kneading the lithium manganate particles obtained in Comparative Example 2 in a resin and then cutting the particles kneaded in the resin using a cross-section polisher.

The lithium manganate particles obtained in Comparative Example 2 were subjected to EPMA mapping in the same manner as defined in Example 2 to determine the presence of Mn and Al on a section of the respective particles. The results are shown in FIG. 5. As shown in FIG. 5, it was confirmed that Al was localized on the surface of the respective particles, and was not uniformly present over the section thereof.

Comparative Example 5

Manganese oxide ($MnO_2$; average particle diameter: 15 μm), aluminum hydroxide ($Al(OH)_3$), boric acid and lithium carbonate were mixed with each other, and then the resulting mixture was calcined at 960° C., thereby obtaining lithium manganate particles.

The lithium manganate particles obtained in Examples 2 to 6 were subjected to a solubility test in the same manner as defined in Example 1. As a result of the solubility test, it was confirmed that a whole amount of boron (Y2 element) which was present in the lithium manganate particles obtained in Examples 2 to 6 was dissolved. Therefore, it was confirmed that boron as the Y2 element was present only on the surface of the respective lithium manganate particles. Further, since the amount of Li dissolved was proportional to the amount of boron dissolved, it was estimated that boron and Li were formed into a compound thereof.

TABLE 1

| Examples and Comp. Examples | Precursor | | | |
|---|---|---|---|---|
| | Kind of Mn compound (—) | Average secondary particle diameter (μm) | Coating element (—) | y (—) |
| Example 1 | $Mn_3O_4$ | 4.8 | Al | 0.10 |
| Example 2 | $Mn_3O_4$ | 4.8 | Al | 0.10 |
| Example 3 | $Mn_3O_4$ | 4.8 | Al | 0.10 |
| Example 4 | $Mn_3O_4$ | 4.8 | Al | 0.10 |
| Example 5 | $Mn_3O_4$ | 4.8 | Al | 0.10 |
| Example 6 | $Mn_3O_4$ | 4.8 | Al | 0.10 |
| Comp. Example 1 | $MnO_2$ | 15 | — | — |
| Comp. Example 2 | $Mn_3O_4$ | 4.8 | Al | 0.10 |
| Comp. Example 3 | $Mn_3O_4$ | 4.8 | Al | 0.10 |
| Comp. Example 4 | $Mn_3O_4$ | 4.8 | Al | 0.10 |
| Comp. Example 5 | $Mn_3O_4$ | 15 | — | — |

| Examples and Comp. Examples | Mixing | | |
|---|---|---|---|
| | | Additives | |
| | Amount of Li x (—) | Kind of element (—) | Particle diameter of additive (μm) |
| Example 1 | 0.072 | B | — |
| Example 2 | 0.072 | B | — |
| Example 3 | 0.072 | B | — |
| Example 4 | 0.072 | B | — |
| Example 5 | 0.072 | B | — |

TABLE 1-continued

| | | | |
|---|---|---|---|
| Example 6 | 0.072 | B | — |
| Comp. Example 1 | 0.065 | Al | 0.5 |
| Comp. Example 2 | 0.072 | B | — |
| Comp. Example 3 | 0.065 | — | — |
| Comp. Example 4 | 0.065 | — | — |
| Comp. Example 5 | 0.065 | Al/B | 0.5 |

| Examples and Comp. Examples | Mixing | | Calcination conditions | |
|---|---|---|---|---|
| | y (—) | B (mol %) | Temperature in air (° C.) | Time (hr) |
| Example 1 | — | 2.0 | 960 | 3 |
| Example 2 | — | 1.0 | 960 | 3 |
| Example 3 | — | 2.0 | 9860 | 3 |
| Example 4 | — | 1.5 | 960 | 3 |
| Example 5 | — | 1.5 | 860 | 3 |
| Example 6 | — | 1.0 | 860 | 3 |
| Comp. Example 1 | 0.10 | 0 | 960 | 3 |
| Comp. Example 2 | — | 2.0 | 760 | 3 |
| Comp. Example 3 | — | 0 | 840 | 3 |
| Comp. Example 4 | — | 0 | 880 | 3 |
| Comp. Example 5 | 0.10 | 2.0 | 960 | 3 |

TABLE 2

Properties of lithium manganate particles

| Examples and Comp. Examples | Composition | Average primary particle diameter (μm) |
|---|---|---|
| Example 1 | $Li_{1.072}Mn_{1.828}Al_{0.1}O_4$ + 0.0183B | 5 |
| Example 2 | $Li_{1.072}Mn_{1.828}Al_{0.1}O_4$ + 0.0091B | 5 |
| Example 3 | $Li_{1.072}Mn_{1.828}Al_{0.1}O_4$ + 0.0183B | 5 |
| Example 4 | $Li_{1.072}Mn_{1.828}Al_{0.1}O_4$ + 0.0137B | 5 |
| Example 5 | $Li_{1.072}Mn_{1.828}Al_{0.1}O_4$ + 0.0137B | 5 |
| Example 6 | $Li_{1.072}Mn_{1.828}Al_{0.1}O_4$ + 0.0091B | 5 |
| Comp. Example 1 | $Li_{1.065}Mn_{1.835}O_4Al_{0.1}$ | 16 |
| Comp. Example 2 | $Li_{1.072}Mn_{1.828}Al_{0.1}O_4$ + 0.0183B | 5 |
| Comp. Example 3 | $Li_{1.065}Mn_{1.835}Al_{0.1}O_4$ | 5 |
| Comp. Example 4 | $Li_{1.065}Mn_{1.835}Al_{0.1}O_4$ | 5 |
| Comp. Example 5 | $Li_{1.065}Mn_{1.835}Al_{0.1}O_4$ + 0.0184B | 16 |

Properties of lithium manganate particles

| Examples and Comp. Examples | Average particle diameter $D_{50}$ (μm) | BET ($m^2/g$) | Lattice constant (nm) | Intensity ratio | |
|---|---|---|---|---|---|
| | | | | I(400) (%) | I(440) (%) |
| Example 1 | 9.5 | 0.38 | 0.8204 | 51 | 27 |
| Example 2 | 9.0 | 0.41 | 0.8199 | 48 | 26 |
| Example 3 | 8.0 | 0.51 | 0.8202 | 42 | 23 |
| Example 4 | 9.2 | 0.51 | 0.8201 | 48 | 24 |
| Example 5 | 8.0 | 0.56 | 0.8199 | 42 | 25 |
| Example 6 | 7.3 | 0.57 | 0.8200 | 43 | 23 |
| Comp. Example 1 | 17.3 | 0.43 | 0.8203 | 32 | 15 |
| Comp. Example 2 | 7.7 | 0.64 | 0.8200 | 40 | 20 |
| Comp. Example 3 | 6.4 | 0.82 | 0.8202 | 32 | 15 |
| Comp. Example 4 | 6.5 | 0.75 | 0.8200 | 35 | 20 |
| Comp. Example 5 | 19.7 | 0.28 | 0.8207 | 45 | 22 |

| Examples and Comp. Examples | Output characteristics Capacity 0.1 C (mAh/g) | High-temperature characteristics (60° C.) | | |
|---|---|---|---|---|
| | | Storage characteristics RTN (%) | RCV (%) | 30Cy Eff. (%) |
| Example 1 | 110 | 59 | 99 | 98 |
| Example 2 | 106 | 55 | 98 | 96 |
| Example 3 | 106 | 59 | 98 | 97 |
| Example 4 | 109 | 57 | 99 | 98 |
| Example 5 | 105 | 57 | 97 | 96 |
| Example 6 | 104 | 63 | 96 | 95 |
| Comp. Example 1 | 107 | 40 | 75 | 88 |
| Comp. Example 2 | 108 | 48 | 88 | 76 |
| Comp. Example 3 | 107 | 63 | 94 | 91 |
| Comp. Example 4 | 106 | 55 | 92 | 88 |
| Comp. Example 5 | 107 | 35 | 90 | 89 |

INDUSTRIAL APPLICABILITY

In the lithium manganate particles according to the present invention, a different kind of metal such as Al, Co or Mg is uniformly present within the respective particles. In addition, the lithium manganate particles have a high crystallinity and, therefore, are suitable as a positive electrode active substance for a secondary battery exhibiting a high output and excellent high-temperature storage characteristics.

The invention claimed is:

1. A process for producing lithium manganate particles having a primary particle diameter of not less than 1 μm, an average particle diameter ($D_{50}$) of 1 to 15 μm and forming particles having substantially a single phase, which have a composition represented by the following chemical formula:

$$Li_{1+x}Mn_{2-x-y}Y1_yO_4+Y2$$

where Y1 is Al; Y2 is at least one other element constituting a sintering aid having a melting point of not higher than 800° C., x and y satisfy $0.03 \leq x \leq 0.15$ and $0.05 \leq y \leq 0.20$, respectively, and Y2 is present in an amount of 0.1 to 2.5 mol % based on Mn;
the Y1 element being dispersed within the respective particles, and
an X-ray diffraction intensity ratio of I(400)/I (111) of the particles being not less than 38% and an X-ray diffraction intensity ratio of I(440)/I(111) thereof being not less than 18%, wherein the lithium manganate particles have a lattice constant of 0.818 to 0.821 nm,
the process comprising the steps of:
mixing lithium carbonate, trimanganese tetraoxide ($Mn_3O_4$) coated with an Al compound, and the sintering aid having a melting point of not higher than 800° C. with each other; and then calcining the resulting mixture at a temperature of 800 to 1050° C. to produce the lithium manganate particles.

2. The process according to claim 1, wherein the lithium manganate particles have a specific surface area of 0.3 to 1.25 m²/g as measured by BET method.

3. The process according to claim 1, wherein the lithium manganate particles have an average particle diameter ($D_{50}$) of 1 to 9.2 μm.

4. A process for producing the lithium manganate particles according to claim 1, wherein the trimanganese tetraoxide coated with the Al compound is obtained by adding an aqueous solution comprising a salt of Al to a water suspension comprising trimanganese tetraoxide to adjust a pH value of the water suspension and thereby form a coat of Al compound on a surface of respective particles of the trimanganese tetraoxide.

5. A process for producing the lithium manganate particles according to claim 4, wherein the coat of Al compound which is formed on the surface of the respective particles of the trimanganese tetraoxide is amorphous as analyzed by X-ray diffraction.

6. A process for producing the lithium manganate particles according to claim 1, wherein the trimanganese tetraoxide is substantially in the form of a single crystal.

7. A process for producing the lithium manganate particles according to claim 1, wherein the trimanganese tetraoxide has an average particle diameter of not less than 1 μm.

8. A process for producing the lithium manganate particles according to claim 1, wherein the sintering aid has a melting point of not higher than 800° C., is a boron compound and Y2 is B (boron).

9. A process for producing the lithium manganate particles according to claim 1, wherein Y2 is B (boron).

* * * * *